Figure 1:
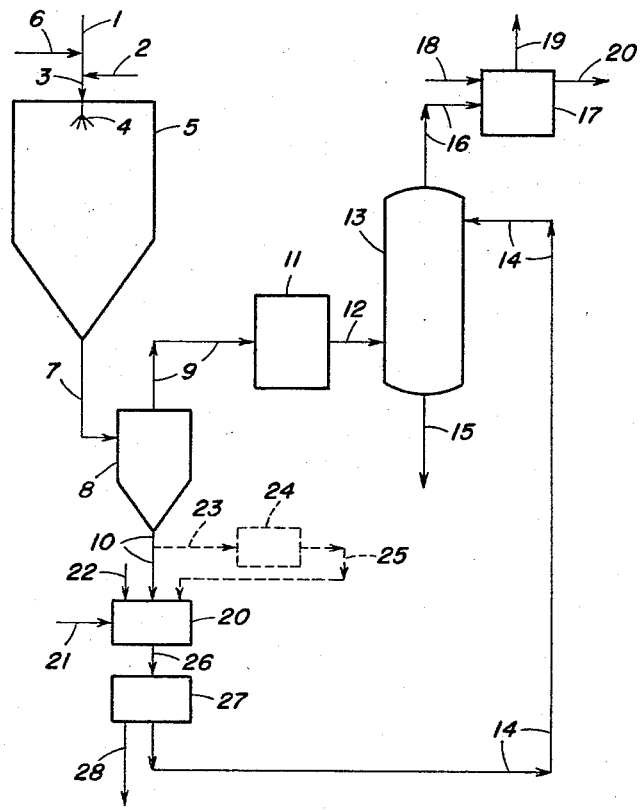

June 6, 1967

S. A. GUERRIERI 3,323,858

PROCESS FOR RECOVERING THE ALKALI METAL CONTENT
OF SPENT PULPING LIQUOR
Filed Aug. 21, 1964

INVENTOR
Salvatore A. Guerrieri

BY
ATTORNEY

United States Patent Office 3,323,858
Patented June 6, 1967

3,323,858
PROCESS FOR RECOVERING THE ALKALI METAL CONTENT OF SPENT PULPING LIQUOR
Salvatore A. Guerrieri, Rowayton, Conn., assignor to The Lummus Company, New York, N.Y., a corporation of Delaware
Filed Aug. 21, 1964, Ser. No. 391,276
10 Claims. (Cl. 23—48)

The present invention has to do with a process for recovering chemicals from spent cellulose liquors. More specifically, the invention relates to an economical and safe process substantially free from products contributing to air pollution.

While it is to be understood that this invention is broadly directed to recovery of chemicals from spend cellulose liquors, for convenience, it is described initially in terms of a kraft black liquor recovery. In the manufacture of kraft paper, a "white liquor" comprising an aqueous solution of sodium sulfide and sodium hydroxide is customarily used in the digestion of wood chips and the like. A spent liquor, commonly referred to as "kraft black liquor," is recovered. The latter liquor contains sodium salts of a variety of complex organic acids derived from lignin present in the wood, and also contains other wood derivatives, sodium sulfide and other sulfur compounds.

Current kraft black liquor recovery processes require the concentration of black liquor and then its combustion in a recovery boiler or furnace. The concentrated black liquor is introduced as a spray through a nozzle or nozzles about midway between the top and bottom of the recovery boiler. The spray, which is rather coarse, flows toward the boiler hearth whereupon water is vaporized and carbonaceous material is partly burned. The spray particles collect in a large pile on the hearth of the furnace and are there burned by introduction of air directed over the pile of burning matter. The carbonaceous material is mostly either distilled off or burned, while the mineral matter is reduced to a mixture of sodium carbonate and sodium sulfide containing relatively small amounts of other mineral constituents. Gases rising from the burning pile pass upwardly through the furnace in countercurrent contact with the descending spray and, after passing through the plane of the black liquor spray nozzles, are contacted with additional air supplied to mix with the rising gases in order to complete the combustion. The gases leaving the combustion chamber pass through a convection section, an economizer section, and then through a purifying train to remove fumes and dust carried out of the furnace by the gases. Any sulfur compound in the gases is burned to sulfur dioxide, which passes out of the stack along with other combustion products. Thus, air pollution is unavoidable.

The sodium carbonate-sulfide mixture formed in the furnace is removed as a smelt from the bottom of the furnace and is sprayed into a tank of water to form a solution of the salts. This solution is then treated with lime to convert the sodium carbonate to sodium hydroxide in order to reconstitute the "white liquor" required for the cooking process.

The recovery furnace is one of the most expensive items of equipment in the black liquor recovery system. Furthermore, the process that occurs in the recovery furnace is not completely safe, since failure of a furnace boiler tube causes water to spill down on to the burning pile of material on the hearth with the result that serious explosions have occurred.

A black liquor recovery process free from a conventional recovery boiler or furnace is attractive from the standpoint of both cost and safety. A black liquor recovery process substantially free from air pollutants is also to be desired. It is with just such a process that the present invention is concerned.

Figure 2:
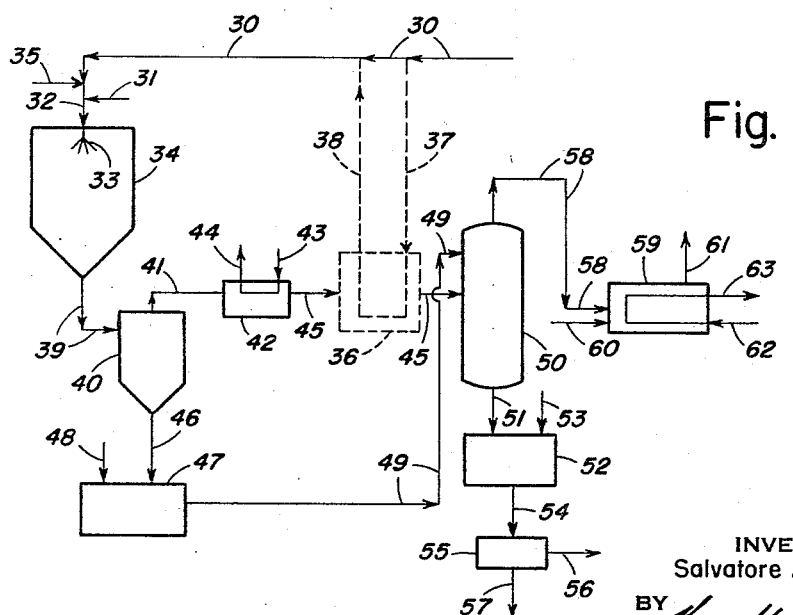

It is an object of the present invention, therefore, to recover alkali from a spent cellulose liquor. Another object is to provide an economical, safe recovery system free from effluent gases contributing to air pollution. Still another object is to regenerate a white liquor from a kraft black liquor in the manufacture of kraft paper. Another object is to recover heat values in the recovery process. Other objects of the invention will be apparent from the following description taken in conjunction with the accompanying drawings. FIGURE 1 constitutes a schematic flow diagram illustrating an embodiment of the invention for recovery of sodium and sulfur values of a kraft black liquor in the form of corresponding white liquor, when gaseous reaction products contain little or no carbon dioxide. FIGURE 2 is a similar diagram illustrating a preferred embodiment for treating a kraft black liquor to recover therefrom sodium sulfur values, when gaseous reaction products contain substantial amounts of carbon dioxide.

In accordance with this invention, and with reference to FIGURE 1, a concentrated kraft black liquor in line 1 and air in line 2 are mixed, and are charged through line 3 and one or more atomizing nozzles 4 into an upper portion of reactor or furnace 5. The kraft black liquor in line 1 is preferably concentrated to about 55–65 percent solids, as in multi-effect evaporators and by direct contact with combustion products from the waste heat boilers (not shown) for use in the present process. And a preferred technique for providing finely divided or atomized black liquor in reactor 5 involves the use of a nozzle or nozzles such as used in fuel oil burners; a Lummus Vortex Burner, as described in U.S. Patents Nos. 2,560,074; 2,560,076 and 2,560,078, is particularly well adapted for such use.

Sufficient air is charged through line 2 to support combustion of the black liquor in reactor 5. However, the quantity of air so supplied is less than that necessary to maintain an oxidizing atmosphere; thus, a neutral or preferably a reducing atmosphere is maintained. Generally, about 50 percent of the total air required for substantially complete combustion is used in reactor 5. The quantity of air is such that the temperature maintained in reactor 5 assures that the resulting inorganic residue remains fluid. Temperatures from about 1700° F. to about 2200° F. are normally so maintained. In kraft operations requiring high pulp yields, the carbonaceous material in the kraft black liquor charged via line 1 may be insufficient to maintain the desired non-oxidizing atmosphere and sufficiently elevated temeprature in reactor 5, in which event supplemental fuel is charged through line 6 for admixture with the black liquor in line 1. The supplemental fuel can be any gaseous or liquid hydrocarbon fuel.

In reactor 5, combustion products containing a smelt primarily comprised of sodium carbonate and gases containing hydrogen sulfide, are formed. The combustion products flow downwardly through reactor 5 and are passed through line 7 into separator 8, which is preferably a cyclone separator. Gaseous combustion products substantially free of solids are removed from separator 8 through overhead line 9, and the inorganic residue or smelt is removed through line 10.

The combustion gases in line 9 are passed into waste heat boiler 11, heat being recovered, for example, by generating steam. From boiler 11, the cooled gases are passed through line 12 to a lower portion of absorber 13, wherein they are in countercurrent contact with sodium hydroxide solution (described below) introduced into an upper portion of the absorber 13 via line 14. In the absorber 13, hydrogen sulfide present in the cooled combustion gases is converted to sodium sulfide and sodium hydrosulfide, with the result that a water solution—a white liquor—of sodium hydroxide, sodium sulfide and sodium hydrosulfide is then removed through discharge line 15. The white liquor removed through line 15 can be used directly for the digestion of wood chips or other cellulosic residues. Generally, however, additional sodium hydroxide and/or sodium sulfide are added thereto (not shown) to make up for losses and to accommodate to digestion and cooking requirements for a particular kraft operation.

Gases substantially free of hydrogen sulfide are passed from absorber 13 through overhead line 16. Such gases generally contain combustible matter, including carbon monoxide, hydrogen, hydrocarbons and the like, which is burned in boiler 17. The gases in 16 are passed into 17 as is air from line 18. Steam is generated from boiler feed water (not shown) in boiler 17 and is removed through line 19. The combustion products in line 20 can be discharged into the atmosphere since they contain little or no material contributing to air pollution.

Referring now to the smelt passed from separator 8 through line 10, such residue is introduced into tank 20 into which water and lime are also introduced through lines 21 and 22, respectively. The smelt can be passed into tank 20 while hot, 1700–2200° F., or can be cooled prior to entry into the tank 20 by passage through line 23, a suitable heat exchanger, a flaker, for example, 24, and line 25. In tank 20, lime reacts with sodium carbonate of the smelt, and an aqueous solution slurry of sodium hydroxide and calcium carbonate is formed. The slurry is passed from tank 20 through line 26 to filter 27, or equivalent separator such as a settler, wherein a sodium hydroxide solution is separated from precipitated calcium carbonate. The latter is removed from filter 27 through line 28, and the sodium hydroxide solution is passed from filter 27 through line 14 to absorber 13 for countercurrent contact with gases introduced into the absorber.

In FIGURE 2, illustration is given for the recovery of sodium and sulfur values from a kraft black liquor, in which recovery gaseous reaction products contain considerable amounts of carbon dioxide. The white liquor obtained by this procedure is substantially free of sodium carbonate, or sodium bicarbonate, by virtue of the liming operation being carried out following the $H_2S$-absorption kraft operation. Thus, a concentrated kraft black liquor (55–65 percent solids) from multi-effect evaporators (not shown) in line 30 is mixed with air in line 31, and the resulting mixture is charged through line 32 and one or more atomizing nozzles 33 into reactor 34. Supplemental fuel can be charged through line 35 for admixture with the black liquor in line 30.

Shown as an optional feature is the use of cooler 36, through which the charge black liquor in line 30 can be passed via lines 37 and 38. In this way, the charge black liquor can be suitably heated when in indirect contact therein with gaseous reaction products, described below.

Formed in reactor 34 are combustion products containing a smelt primarily comprised of sodium carbonate and gases containing hydrogen sulfide and carbon dioxide. Combustion products are removed from 34 through line 39 and are passed into separator 40, preferably a cyclone separator. Gaseous combustion products substantially free of solids are passed from separator 40 through line 41 to heat exchanger 42, wherein they are in indirect heat exchange with water introduced into 42 through line 43. Steam is removed from exchanger 42 through line 44, thereby recovering heat from the gaseous combustion products. Cooled gaseous combustion products are passed from exchanger 42 through line 45 and, as indicated above, may be passed through direct contact cooler 36.

Referring back to separator 40, the smelt or inorganic residue therein is passed through line 46 into tank 47, to which water is also passed through line 48. An aqueous solution of sodium carbonate and sodium hydroxide is formed in tank 47. This solution is passed through line 49 to an upper portion of absorber 50, wherein it passes downwardly and countercurrently to gaseous combustion products introduced from line 45 to a lower portion of absorber 50. Hydrogen sulfide in the gaseous combustion products is converted to sodium sulfide and sodium hydrosulfide. Carbon dioxide in the gaseous reaction products is absorbed by the sodium hydroxide. An aqueous solution of sodium carbonate, sodium sulfide and hydrosulfide is removed from absorber 50 through line 51 to tank 52 into which lime is introduced through line 53. Lime reacts with aqueous sodium carbonate in tank 52 to form calcium carbonate and aqueous sodium hydroxide. The aqueous slurry of sodium sulfide, sodium hydroxide, and calcium carbonate thus formed in tank 52 is passed through line 54 to filter 55. Calcium carbonate is removed from filter 55 through line 56, and white liquor is removed through line 57.

Any hydrogen sulfide of the combustion gases not absorbed in absorber 50 flows through line 58 to boiler 59 wherein it can be burned with air, introduced through line 60, to sulfur dioxide. The latter can be removed from boiler 59 through stack 61. Water is introduced into boiler 59 through line 62, and steam is removed through line 63.

The present invention is more fully described and illustrated in the following example, which follows the procedure shown in FIGURE 2. It is to be understood, however, that the invention is not to be limited to any specific form of materials or conditions set forth in the example, but is limited solely by the description in the specification and the appended claims. All parts are by weight unless otherwise specified.

Charged through line 30 is a kraft black liquor (55 weight percent solids), having a solids composition of:

Sodium as—
$Na_2CO_3$ _____pound mols__ 7.745
$Na_2S$ _____do____ 3.51
$Na_2SO_4$ _____do____ 0.17
Carbon as organic carbon _____ pound atoms__ 88.59

Air charged through line 31 is 221 pounds mols. Temperature of reactor 34 is about 2000° F. Products removed from reactor 34 through line 39 have a temperature of about 2000° F. and comprise:

| Gas containing— | Pound mols |
|---|---|
| CO (or equivalent) | 95 |
| $H_2S$ | 3.51 |
| $H_2O$, $N_2$, $CO_2$, etc. | 275 |
| Smelt containing— | |
| $Na_2CO_3$ | 11.26 |
| $Na_2SO_4$ | 0.17 |

The sodium carbonate solution formed in tank 47 and passed through line 49 to absorber 50 is at a temperature of about 100° F. and has a concentration of about 15 percent. The temperature of the gaseous combustion products introduced from line 45 to absorber 50 is about 400° F. The temperature of gases removed from absorber 50 through line 58 is about 100° F. The quantity of gases charged to boiler 59 through line 58 is 230 pounds mols. Broiler 59 is maintained at about 600° F. Heat recovery in the form of steam is 7,500,000 B.t.u./hour. The quantities given in this example are on the basis of a short ton of air-dry pulp. White liquor recovered through line 57 comprised 25 pound moles of a mixture essentially of sodium hydrosulfide and sodium hydroxide, with less than 15 percent sodium carbonate and some sulfate, in a water solution having a sulfidity of 30–31 percent and an active alkali concentration of 100–120 grams per liter.

Advantages of the present invention are several fold as will be apparent from the foregoing description. Substitution of a relatively simple reactor in combination with a heat exchanger and a waste heat boiler in place of the customary recovery boiler or furnace, materially reduces the cost of recovery plant. Additionally, the explosion hazard attending current recovery boilers is eliminated. Air pollution characteristic of present recovery boilers is substantially eliminated.

While air has been shown for use as a combustion gas in furnace 5 and boiler 17, it is to be understood that oxygen can be used in place of, or in admixture with, air. However, air is preferred in view of its normally much lower cost. The dilution effect of nitrogen upon the desired combustion gases is small and not disadvantageous. Broadly, a free-oxygen containing gas such as one containing free oxygen and an inert gas (e.g., nitrogen) can be employed.

Although the process of this invention has been described and illustrated with particularity with respect to the treatment of kraft black liquors, it is to be understood that the process is also applicable to the treatment of residual or spent liquors obtained from a variety of sources in alkaline processing of cellulosic materials.

The invention has been described in detail according to preferred materials and preferred operating conditions; however, it will be obvious to those skilled in the art that changes and modifications can be made, without departing from the spirit or scope of the invention, and it is intended in the appended claims to cover such changes and modifications.

I claim:

1. A process for recovering alkali metal content from a spent pulping liquor comprising:
    (a) introducing the liquor in a finely divided state, and an oxygen containing gas into a combustion zone to effect combustion of the liquor at a temperature between about 1700° F. and about 2200° F., the quantity of oxygen containing gas introduced being sufficient to maintain combustion in a reducing atmosphere, said combustion converting the liquor to an inorganic smelt containing an alkali metal carbonate and a combustion gas containing hydrogen sulfide;
    (b) removing the inorganic smelt, and the combustion gas from the combustion zone;
    (c) separating the smelt and the combustion gas to thereby recover the alkali metal content; and
    (d) contacting the combustion gas with an absorption solution containing sodium hydroxide solution to remove hydrogen sulfide therefrom.

2. The process of claim 1 wherein the alkali metal is sodium.

3. The process defined by claim 1 wherein said spent liquor and combustion gas are introduced into an upper portion of said reactor and resulting combustion products thereof are passed downwardly therein for removal from a lower portion of said reactor.

4. The process of claim 2 further comprising; cooling the sodium carbonate, adding water and an alkaline earth metal oxide to the sodium carbonate to produce sodium hydroxide, and passing the sodium hydroxide to step (d) to remove hydrogen sulfide from the combustion gas and form a white liquor.

5. The process of claim 4 wherein the combustion gases are passed in an indirect heat transfer relationship with a heat transfer agent, prior to step (d), to recover heat therefrom.

6. The process of claim 5 wherein the combustion gas from step (d) is burned to recover heat values therefrom.

7. The process of claim 2 further comprising: contacting the smelt with water to produce a solution containing sodium carbonate and sodium hydroxide, and passing the sodium carbonate and sodium hydroxide to step (d) to remove hydrogen sulfide from the combustion gas.

8. The process of claim 7 wherein lime is added to the absorption solution withdrawn from step (d) to produce a white liquor.

9. The process of claim 7 wherein the combustion products are cooled by indirect heat transfer with a heat transfer agent prior to step (d).

10. The process of claim 9 wherein the heat transfer agent is spent pulping liquor being passed to step (a).

References Cited
UNITED STATES PATENTS

| | | | |
|---|---|---|---|
| 2,376,435 | 5/1945 | Saddington | 23—134 |
| 2,574,193 | 11/1951 | Savell | 162—30 |
| 3,083,077 | 3/1963 | Bjorkman et al. | 23—48 |
| 3,210,235 | 10/1965 | Ferrigan et al. | 162—30 |
| 3,236,589 | 2/1966 | Reinhall et al. | 23—48 |

OSCAR R. VERTIZ, Primary Examiner.

MILTON WEISSMAN, Examiner.

G. T. OZAKI, Assistant Examiner.